United States Patent [19]

Christianson

[11] 4,029,120

[45] June 14, 1977

[54] LINKAGE FOR THE DEMAND REGULATOR OF A BREATHING APPARATUS

[76] Inventor: Raymond A. Christianson, P.O. Box 1513, Manhattan Beach, Calif. 90266

[22] Filed: June 30, 1975

[21] Appl. No.: 591,711

Related U.S. Application Data

[62] Division of Ser. No. 508,580, Sept. 23, 1974, abandoned.

[52] U.S. Cl. .......................... 137/494; 137/DIG. 9; 251/58; 128/142.2; 251/232; 251/251

[51] Int. Cl.² .......................................... F16K 31/12

[58] Field of Search ............. 137/102, DIG. 9, 494, 137/491, 489.5, 505.47; 251/232, 238, 242, 251, 243, 244, 58; 128/142.2

[56] References Cited

UNITED STATES PATENTS

| | | | |
|---|---|---|---|
| 766,416 | 8/1904 | Booth | 137/449 X |
| 1,212,879 | 1/1917 | Auld et al. | 137/505.47 |
| 1,546,032 | 7/1925 | Schroeder | 137/449 X |
| 1,716,705 | 6/1929 | McEwan | 137/505.47 |
| 1,732,107 | 10/1929 | Morgan et al. | 137/446 X |
| 2,153,854 | 4/1939 | Walker | 251/232 |
| 2,591,356 | 4/1952 | Howe, Jr. | 251/239 X |
| 2,817,334 | 12/1957 | Sajeck | 251/118 X |
| 3,495,619 | 2/1970 | Iizumi | 137/489.5 |

*Primary Examiner*—William R. Cline
*Assistant Examiner*—H. Jay Spiegel
*Attorney, Agent, or Firm*—Howard A. Silber

[57] ABSTRACT

In a scuba or other breathing apparatus, the demand regulator includes a diaphragm connected by a linkage to a valve that supplies breathable gas to the user in response to inhalation demand, as sensed by the diaphragm. The linkage includes a diaphragm-connected lever situated between a ball restrained for axial movement and a fixed member having a spherical surface facing the ball. The lever pivots on the spherical surface to cause sensitive displacement of the ball and hence actuation of the valve.

13 Claims, 7 Drawing Figures

Fig. 2
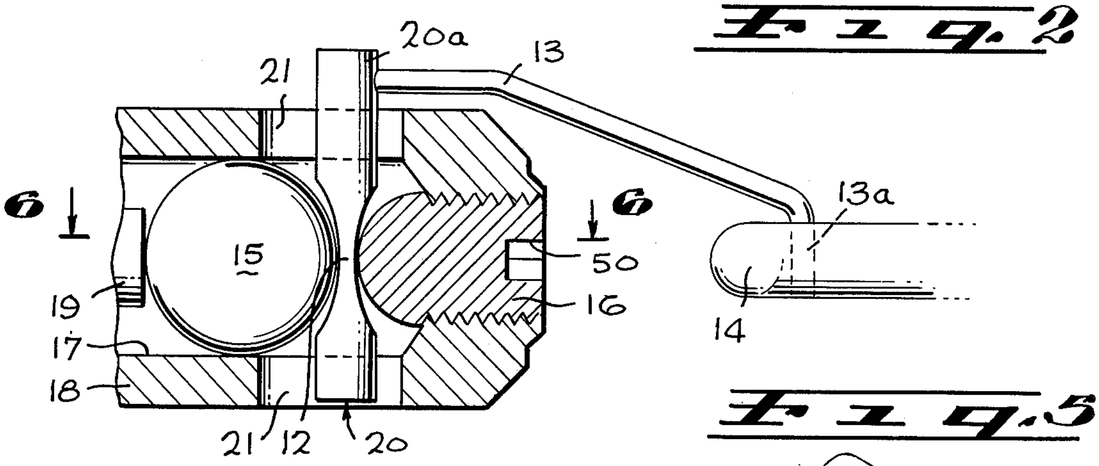
Fig. 5
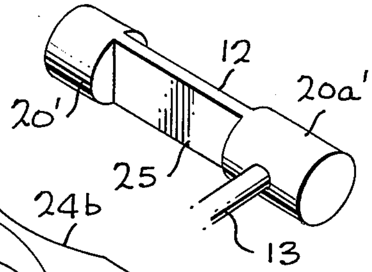
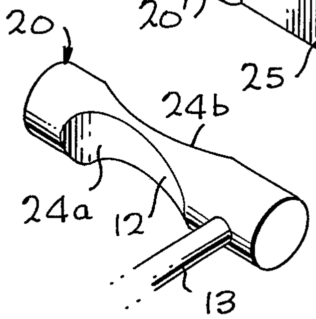
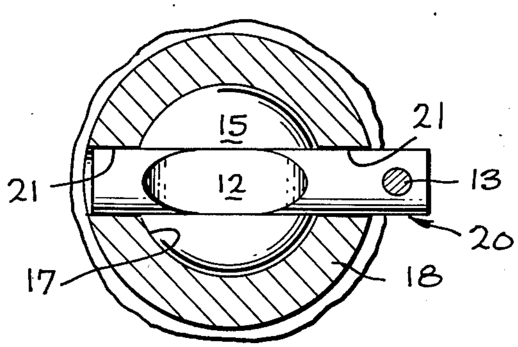
Fig. 4
Fig. 3
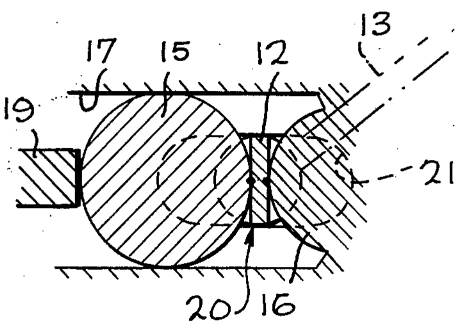
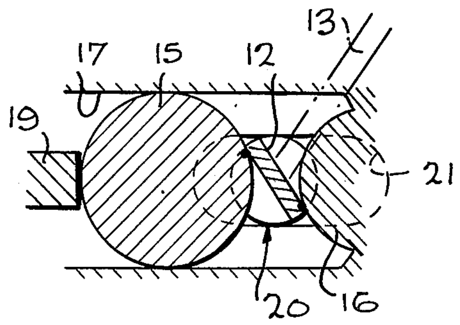
Fig. 6
Fig. 7

LINKAGE FOR THE DEMAND REGULATOR OF A BREATHING APPARATUS

BACKGROUND OF THE INVENTION

1. Related Applications

This application is a division of application Ser. No. 508,580 filed Sept. 23, 1974, now abandoned.

2. Field of the Invention

The present invention relates to a linkage for connecting the diaphragm to the flow control valve of a breathing apparatus demand regulator.

3. Description of the Prior Art

In the demand regulator of a scuba or other breathing apparatus, inhalation demand is sensed by a diaphragm exposed to the pressure at the mouthpiece outlet. During inhalation, the decreased pressure causes a slight movement of the diaphragm, which in turn causes the flow control valve to open. Inhalation demand begins slowly and reaches a maximum about half way through the inhalation cycle. Thereafter the demand decreases until exhalation begins. Opening of the flow control valve should closely follow this sensed demand.

At the beginning of inhalation it is desirable to open the flow control valve gradually so that the user does not get a sudden blast of breathable gas. Thereafter, as the inhalation demand increases more quickly, it is preferable to obtain a greater change in valve spacing for the same extent of diaphragm displacement. Thus it is advantageous to have a non-linear relationship between diaphragm displacement and the extent of valve opening to insure that the flow of breathable gas supplied to the user will satisfy the demand throughout the inhalation cycle. An object of the present invention is to provide a linkage that will facilitate this non-linear relationship.

The diaphragm linkage also should provide a mechanical advantage so as to translate the displacement of a relatively lightweight diaphragm into movement through a shorter distance of a more massive valve poppet. Another object of the present invention is to provide a linkage with such mechanical advantage. Such mechanical advantage may be obtained by a lever arrangement. However, the spatial arrangement of the diaphragm and flow control valve is such that length of the effective lever arm changes as the diaphragm moves. Prior art linkages did not adequately compensate for this length change. Another object of the present invention is to provide a diaphragm-to-valve linkage which provides the requisite mechanical advantage and takes advantage of the effective lever arm length change without the introduction of flutter.

SUMMARY OF THE INVENTION

These and other objectives are achieved by a novel linkage that utilizes a rigid ball situated within a cylindrical extension of the flow control valve housing. The flow control valve includes a valve poppet having an end that is in contact with the ball. On the opposite side of the ball is situated a fixed member having a spherical surface. A lever that is flat or of reduced curvature is situated between the ball and the opposing spherical face of the stationary member. Displacement of the diaphragm causes this member to pivot about the spherical surface, thereby axially displacing the ball to impart movement to the valve poppet and open the flow valve. This linkage has very high mechanical advantage at small displacements from the meutral or rest position, but provides proportionally less mechanical advantage as the displacement increases.

In a more general embodiment, the invention comprises a first, relatively fixed member having an arcuate surface, and a second, relatively movable member having an arcuate surface opposite said first member and being movable only axially, and a lever between said two members in contact with both arcuate surfaces.

BRIEF DESCRIPTION OF THE DRAWINGS

A detailed description of the invention will be made with reference to the accompanying drawings wherein like numerals designate corresponding elements in the several figures.

FIG. 2 is a fragmentary sectional view of the linkage as viewed along the line 2—2 of FIG. 1.

FIG. 3 is a transverse sectional view of the linkage as viewed along the line 3—3 of FIG. 1.

FIG. 4 is a perspective view of the lever used in the linkage of FIG. 1.

FIG. 5 is a perspective view of an alternative lever configuration.

FIGS. 6 and 7 are diagrammatic views showing operation of the inventive linkage.

DESCRIPTION OF THE PREFERRED EMBODIMENT

Figure 1:
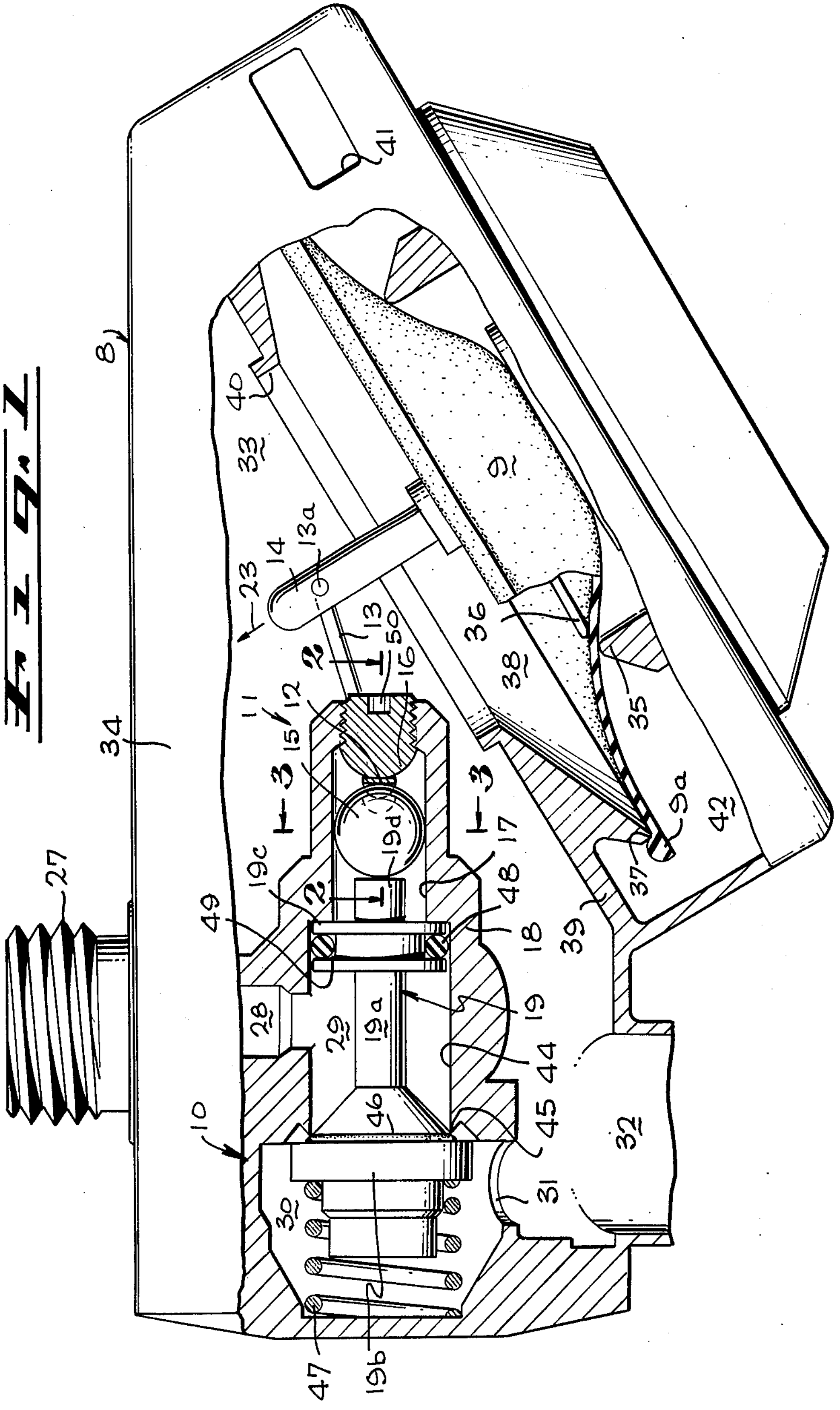
FIG. 1 is a plan view of a demand regulator, partly cut away and in section to show the novel linkage.

The following detailed description is of the best presently contemplated mode of carrying out the invention. This description is not to be taken in a limiting sense, but is made merely for the purpose of illustrating the general principles of the invention since the scope of the invention best is defined by the appended claims.

In the demand regulator of FIG. 1, the pressure sensing diaphragm 9 is connected to the flow control valve 10 by means of the inventive linkage 11. The linkage 11 comprises a flat lever 12 connected via an arm 13 to the diaphragm shaft 14. The lever 12 is situated between a ball 15 and a stationary, generally hemispherical member 16. The ball 15 is constrained for axial movement only within a cylindrical bore or channel 17 inside the valve housing 18. The other side of the ball 15 is in contact with the poppet 19 of the valve 10.

As shown in FIG. 2 through 4, the lever 12 is part of a cylindrical rod 20 that extends across the channel 17 and is freely mounted in a pair of slots 21 through opposite walls of the housing 18. The slots 21 are elongated in a direction parallel to the axis of the channel 17. An end **20*a* of the rod 20 projects beyond the housing 18 and is rigidly connected to the arm 13. The other end 13*a* of the arm 13 is pivotally connected to the diaphragm shaft 14.**

Preferably the lever 12 has a rectangular cross-section in the plane 6—6 through the axis of the channel 17 perpendicular to the axis of the rod 20. Thus in the rest position of FIGS. 1, 2 and 6 there is point contact between the lever 12 and both the ball 15 and the arcuate member 16 along the axis of the channel 17.

When the diaphragm 9 and its shaft 14 are displaced in the direction of the arrow 23 (FIG. 1), the arm 13 and the rod 20 together pivot counterclockwise as viewed in the drawings, for example, from the position of FIG. 6 to that of FIG. 7. The axis of rotation corresponds to the axis of the rod 20, however during this rotation the rod 20 itself moves linearly along the slots 21.

Since the hemispherical member 16 is fixed with respect to the housing 17, counterclockwise rotation of the lever 12 imparts axial movement to the ball 15 within the channel 17. As a result, the ball 15 pushes the poppet 19 to the left as viewed in FIGS. 6 and 7, thereby opening the flow control valve 10. For small displacement of the diaphragm 9 and concomitant small rotation of the lever 12 there is very slight motion imparted to the ball 15 and thence to the valve poppet 19. With increasing displacement of the diaphragm 9, an equal angular pivoting of the lever 12 imparts a relatively larger motion to the ball 15 and hence to the valve poppet 19. This non-linear relationship is beneficial since more sensitive control is achieved at the beginning and end of the inhalation cycle; when the pressure differential sensed by the diaphragm 9 is very slight.

In the embodiment of FIG. 4, the lever 12 is at the center of a pair of opposed arcuate recesses 24 *a*, **24*b* formed in the rod 20. In the alternative embodiment of FIG. 5, the lever 12 is at the center of a flat bar 25 of rectangular cross-section that extends between end rod sections 20' and 20*a*'**.

The demand regulator 8 may comprise the second stage of a self-contained underwater breathing apparatus. A supply of breathable gas is connected by a conduit (not shown) to an inlet port 27. Inhalation demand is sensed by the diaphragm 9 that is connected via the linkage 11 to the flow control valve 10. Displacement of the diaphragm 9 causes the valve 10 to open, thereby supplying breathable gas from the inlet port 27 to the user via an inlet channel 28, the annular space 29 surrounding a portion **19*a* of the valve poppet 19, the open valve 10, a chamber 30 within the valve housing 18, as aspirator opening 31, and an outlet port 32** to which a mouthpiece (not shown) is attached.

The diaphragm 9 may be of the type shown in the inventor's copending application entitled DIAPHRAGM ASSEMBLY FOR THE DEMAND REGULATOR OF A BREATHING APPARATUS. Alternatively, the diaphragm 9 may be of any conventional design. In the embodiment of FIG. 1, the diaphragm 9 is made of resilient rubber or plastic, and has a slightly concave, circular shape. Although hidden from view in FIG. 1, the center of the diaphragm 9 is rigidly connected to the shaft 14 that projects into the inner chamber 33 within the body 34 of the regulator 8.

In the embodiment of FIG. 1, the central portion of the diaphragm 9 rests on an annular seat 35, and is prevented from rearward motion by a rigid disk 36 that is concentrically attached to the shaft 14. The periphery **9*a* of the diaphragm 9 rests on the circular rim 37 of a conical platform 38. The platform 38 is formed in a partition 39 within the body 34, and has a central opening 40. One or more openings 41 in the body 34 admit water into the region 42 behind the diaphragm 9**.

During inhalation the pressure in the inner chamber 33 drops below ambient level. As a result, the diaphragm 9 is displaced inward so as to move the shaft 14 in the direction of the arrow 23. In the embodiment shown, the diaphragm 9 and the disk 36 are displaced off of the seat 35 during such inhalation. During exhalation, the increased pressure in the chamber 33 causes the periphery **9*a* of the diaphragm 9 to deflect rearward away from the rim 37. This permits the exhaust of exhaled gases via the space between the rim 37 and the diaphragm periphery 9*a*, through the region 42 and out of the regulator 8 via the openings 41**.

The flow control valve 14 includes the unitary poppet 19 that moves axially within a bore 44 within the valve housing 34. The bore 44 opens into the region 30, and the annular edge 45 at the open end of the bore 44 forms the valve seat. The poppet 19 includes a flange or shoulder **19*b* having a diameter greater than the bore 44 and situated within the region 30. An O-ring 46 mounted in a groove in the shoulder 19*b* serves as the closure for the valve 10. In the closed position of FIG. 1, the O-ring 46 is in sealing contact with the annular valve seat 45. The poppet 19 is biased to this closed position by a spring 47 in the region 30**.

When the poppet 19 is moved to the left as viewed in FIG. 1, the O-ring 46 is carried away from the seat 45, thereby opening an annular flow path from the inlet channel 28 via the interior 29 of the bore 44, the space between the O-ring 46 and the seat 45, to the region 30. From there, the breathable gas passes through the aspirator opening 31 to the outlet 32.

As described above, most of the linkage 11 is contained in the cylindrical bore 17 which communicates with the bore 44. Leakage of breathable gas into the bore 17 is prevented by an O-ring seal 48 situated in a groove 49 of a flange **19*c* that is part of the poppet 19. A small diameter section 19*d* of the poppet 19 projects beyond the flange 19*c* into the bore 17. This section 19*d* functions as the control member for the valve 10 and is in contact with the ball 15** as described above.

Advantageously, but not necessarily, the hemispherical member 16 is threaded into the valve housing 18 as shown in FIGS. 1 and 2. A hexagonal recess 50 is provided at the end of the member 16 to receive a hex-wrench or like tool. This permits adjustment of the position of the member 16 axially of the bore 17, so as to insure contact between the poppet end **19*d*, the ball 15, the lever 12 and the member 16 when the poppet 19 is biased closed as shown in FIGS. 1 and 2. This adjustment normally is made only when the regulator 8** is assembled.

The use of the rigid ball 15 is not necessary, since the broad concept of the linkage is the use of two opposed arcuate surfaces, one relatively movable and the other relatively fixed, with the lever between. This may be implemented, e.g., by omiting the ball 15, extending the length of the projecting end **19*d* of the poppet 19, and providing an arcuate surface on this end 19*d*. In the rest position, the lever 15 then would be in contact with the opposed arcuate surfaces of the fixed member 16 and the movable poppet end 19*d***.

Intending to claim all novel, useful and unobvious features shown or described, the applicant claims:

1. In a demand regulator for a breathing apparatus, the improvement comprising;

a flow valve for controlling the flow of breathable gas from a source to a mouthpiece, said flow valve having a control element extending therefrom, and a diaphragm for sensing inhalation demand and a linkage between said diaphragm and said flow valve control element, said linkage comprising:

a rigid ball restrained for movement only along a single axis, said element being in contact with said ball, a fixed member having a convex arcuate surface facing said ball on the side opposite said element, and a lever member situated between said ball and, said arcuate surface and linked to said diaphragm so that displacement of said diaphragm causes said lever member to pivot about said arcuate surface, therby moving said ball along said axis and imparting movement to said control element to operate said flow valve.

2. A linkage for demand regulator according to claim 1 wherein said flow valve is in a valve housing having a cylindrical channel therein, and wherein said ball is within said cylindrical channel, the diameter of said ball being substantially the same as the inner diameter of said cylindrical channel so that said ball is free to move only axially thereof, said control element extending into said cylindrical channel and being in contact with said ball.

3. A linkage for a demand regulator according to claim 2 wherein said valve housing includes a pair of slots on opposite sides of said channel, said slots being elongated parallel to the axis of said channel, and wherein said lever is part of a rod that extends through said slots and across said channel, wherein said diaphragm has a rigid shaft attached thereto, and wherein an end of said rod projects outside of said valve housing and is connected by an arm to said shaft, so that displacement of said diaphragm and shaft is translated to rotation of said lever.

4. A linkage for a demand regulator according to claim 3 wherein lever has a substantially rectangular cross-section in the plane through the axis of said channel perpendicular to the axis of said rod.

5. A linkage for a demand regulator according to claim 2 wherein said control element is part of the poppet of said flow valve, and wherein said valve includes means for biasing said flow valve closed with an end of said poppet against said ball.

6. A linkage for a demand regulator according to claim 5 wherein said fixed member having an arcuate surface is attached to said valve housing and is adjustably positionable at the end thereof so that said arcuate surface, said lever, said ball and said control element all are in contact when said flow valve is biased closed.

7. A demand regulator for a self contained underwater breathing apparatus, comprising:

a regulator body having an inlet port to receive a supply of breathable gas and an outlet communicating to a mouthpiece, a flow control valve situated in a valve housing within said body, said valve being biased closed and being openable to permit the flow of breathable gas from said inlet port to said outlet, said outlet being in communication with the interior chamber of said body, a diaphragm within said body interior chamber, said diaphragm being displaced in response to decreased pressure in said chamber during inhalation, said diaphragm having a shaft attached thereto, and a linkage operatively connecting said diaphragm shaft to said flow control valve, said linkage comprising;

a rigid ball situated in a cylindrical extension of said valve housing, said ball being movable only axially of said cylindrical extension and being in contact with a control member of said valve, another member having a round surface within said cylindrical extension facing said ball, said other member being fixed with respect to said cylindrical extension, and a lever member situated between said ball and said member round surface and linked to said diaphragm shaft so that diaphragm displacement causes an angular pivotal motion of said lever member to move said ball toward said valve member, thereby pushing said control member to open said flow control valve.

8. A demand regulator according to claim 7 wherein said control member is part of a poppet in said flow control valve, said poppet being biased into a closed position in which said control member, said ball, said lever member and said round surface all are in contact along a common axis when said diaphragm is in the rest position, and wherein said other member having said round surface is adjustable axially of said cylindrical extension to obtain said contact in said rest position.

9. A demand regulator according to claim 7 wherein said lever member comprises a rod having a median region of generally rectangular cross-section situated between said ball and said round surface, said rod extending through a pair of elongated slots on opposite sides of said cylindrical extension, and an arm fixed at one end to said rod and pivotally connected at the other end to said diaphragm shaft.

10. In a demand regulator for a breathing apparatus, the improvement comprising;

a flow valve for controlling the flow of breathable gas from a source to a mouthpiece, said flow valve having a control element extending therefrom, and a diaphragm for sensing inhalation demand, and a linkage between said diaphragm and said flow valve control element, said linkage comprising;

a first, relatively movable member having a arcuate surface, said control element being moved by said first member, a second, relatively fixed member having an arcuate surface facing the arcuate surface of said first member, and a lever situated between said two arcuate surfaces and linked to said diaphragm so that displacement of said diaphragm causes said lever to pivot about said arcuate surfaces, thereby moving said first member and imparting movement to said control element to operate said flow valve.

11. A demand regulator according to claim 10 wherein said first member comprises an arcuate surface on said control element.

12. A demand regulator according to claim 11 wherein said flow valve includes a valve poppet, and wherein said control element is part of said poppet.

13. In a regulator mechanism for a breathing apparatus, the improvement comprising:

a flow valve for controlling the amount of breathable gas available to a user of said breathing apparatus, said flow valve having a control element extending therefrom, a diaphragm for sensing breathing demand, and a linkage between said diaphragm and said flow valve control element, said linkage comprising:

a rigid ball restrained for movement only along a single axis, said element being in contact with said ball, a fixed member having a convex arcuate surface facing said ball on the side opposite said element, and a lever member situated between said ball and said arcuate surface and linked to said diaphragm so that displacement of said diaphragm causes said lever member to pivot about said arcuate surface, thereby moving said ball along said axis and imparting movement to said control element to operate said flow valve.

* * * * *